US009117102B2

(12) United States Patent
Thomas et al.

(10) Patent No.: US 9,117,102 B2
(45) Date of Patent: Aug. 25, 2015

(54) AUTOMATED IMAGING OF PREDETERMINED REGIONS IN SERIES OF SLICES

(71) Applicants: Carl Zeiss AG, Oberkochen (DE); Carl Zeiss Microscopy GmbH, Jena (DE)

(72) Inventors: Christian Thomas, Hamm (DE); Martin Edelmann, Aalen (DE); Thomas Albrecht, Aalen (DE); Christian Wojek, Aalen (DE)

(73) Assignees: Carl Zeiss Microscopy GmbH, Jena (DE); Carl Zeiss AG, Oberkochen (DE)

( * ) Notice: Subject to any disclaimer, the term of this patent is extended or adjusted under 35 U.S.C. 154(b) by 163 days.

(21) Appl. No.: 13/894,532

(22) Filed: May 15, 2013

(65) Prior Publication Data
US 2013/0279752 A1 Oct. 24, 2013

Related U.S. Application Data

(63) Continuation of application No. PCT/EP2011/072810, filed on Dec. 14, 2011.

(30) Foreign Application Priority Data

Dec. 15, 2010 (DE) .......................... 10 2010 054 862
Dec. 15, 2010 (DE) .......................... 10 2010 054 863

(51) Int. Cl.
G06K 9/00 (2006.01)
G02B 21/36 (2006.01)
G02B 21/16 (2006.01)
G02B 21/18 (2006.01)

(52) U.S. Cl.
CPC .......... G06K 9/00134 (2013.01); G02B 21/367 (2013.01); G02B 21/16 (2013.01); G02B 21/18 (2013.01)

(58) Field of Classification Search
CPC .......... G06T 2207/10056; G06T 2207/30024; G06T 7/0028; G02B 21/16; G02B 21/18; G02B 21/367; G06K 9/00134
USPC .................................................. 382/128, 103
See application file for complete search history.

(56) References Cited

U.S. PATENT DOCUMENTS

| 5,241,607 | A | 8/1993 | Launay et al. |
| 7,177,454 | B2 * | 2/2007 | McLaren et al. .............. 382/128 |
| 2006/0045505 | A1 * | 3/2006 | Zeineh et al. ................... 396/89 |
| 2007/0076983 | A1 * | 4/2007 | Doerrer ......................... 382/295 |
| 2007/0280517 | A1 | 12/2007 | De La Torre-Bueno et al. |
| 2008/0152207 | A1 | 6/2008 | Micheva et al. |
| 2010/0253774 | A1 | 10/2010 | Yoshioka et al. |

FOREIGN PATENT DOCUMENTS

| DE | 68905190 T2 | 9/1993 |
| WO | WO 95/23386 | 8/1995 |
| WO | WO 01/31566 | 5/2001 |
| WO | WO 2005/024395 | 3/2005 |

OTHER PUBLICATIONS

German Examination Report, and English translation thereof, for corresponding DE Appl No. 10 2010 054 862.6, dated Jan. 10, 2013.
Robinson et al., "Correlative Fluorescence and Electron Microscopy on Ultrathin Cryosections: Bridging the Resolution Gap," J. Histochemistry & Cytochemistry, vol. 49(7): 803-808, 2001.
International Search Report for corresponding PCT Appl No. PCT/EP2011/072810, dated Mar. 29, 2012.

* cited by examiner

Primary Examiner — Tom Y Lu
(74) Attorney, Agent, or Firm — Fish & Richardson P.C.

(57) ABSTRACT

The invention provides a method for the magnified depiction of samples, wherein at least two sections from a sample, which are present on at least one sample carrier, are depicted in magnified form using an apparatus for the magnified depiction of samples, wherein the sample carrier is connected to the apparatus via a sample carrier holder, wherein the position of the depicted sample carrier regions in relation to the apparatus and the magnification stage used are recorded, at least one selected feature contained in the image information from the sections depicted in magnified form, particularly at least one suitable contour and/or structure, is/are used to define local coordinate systems, which are specific to the respective section, for the at least two sections depicted in magnified form, at least one region within at least one of the sections depicted in magnified form is/are selected (selection region) and the relative position of this at least one selection region in relation to the local coordinate system defined for the respective section, and the position of said selection region in relation to the apparatus, are ascertained, the relative position of this at least one selection region is transmitted to the local coordinate system of the at least one further section depicted in magnified form in order to stipulate at least one corresponding adjacent region on this section, the position of the adjacent region in relation to the apparatus is ascertained, and the at least one previously stipulated selection region and/or the at least one corresponding adjacent region is/are approached by the apparatus and depicted in magnified form, preferably at high magnification. In addition, the invention provides an apparatus—that is set up to carry out the method—for the magnified depiction of samples and also a computer program product which prompts an apparatus for the magnified depiction of samples to carry out the method.

28 Claims, 8 Drawing Sheets

AUTOMATED IMAGING OF PREDETERMINED REGIONS IN SERIES OF SLICES

CROSS-REFERENCE TO RELATED APPLICATIONS

This application is a continuation of, and claims priority under 35 U.S.C. §120, to international patent application PCT/EP2011/072810, filed Dec. 14, 2011, which claims benefit under 35 U.S.C. 119 of: German patent application 10 2010 054 862.6, filed Dec. 15, 2010; and German patent application 10 2010 054 863.4, filed Dec. 15, 2010. The entire contents of international patent application PCT/EP2011/072810 are incorporated herein by reference.

FIELD

The present invention relates to a method for magnified imaging of samples, a device for magnified imaging of samples and a computer program product for a device which images a sample in a magnified fashion. In particular, the present invention relates to such devices and methods in which selected regions are imaged in a magnified fashion within series slices during a procedure comprising a number of steps.

BACKGROUND

Imaging with the highest possible resolution of individual regions of interest in a series of slices is desirable, particularly for biological samples. Three-dimensional information, in particular, in respect of specific regions of interest within a sample volume is often obtained in this fashion.

To this end, a sample is usually cut into a multiplicity of, often up to several hundred, thin slices. The slices are arranged on suitable sample carriers and are initially observed, particularly via light or electron microscopy, and regions of interest sought after. A detected selected region of interest is subsequently directed into the center of the field of view and thereafter targeted and imaged with high magnification. Corresponding regions on the neighboring slices (neighboring regions) are now sought after manually with great difficulty and these regions are subsequently likewise imaged at high magnification ("conventional approach" in Vicidomini et al., High Data Output and Automated 3D Correlative Light-Electron Microscopy Method, Traffic 2008; 9: 1828-1838). The results of this complicated process are very often very unsatisfactory and results which are at all utilizable can only be obtained with much experience and skill. In the case of optical microscopes, there is the basic problem in that light-sensitive preparations very often already experience irreversible damage in the time required for finding corresponding regions again and for example bleach before the individual regions of interest and the neighboring regions thereof are captured in image form with the desired quality. Comparable problems occur in the particle beam microscope. By way of example, a sample in the electron microscope is, under certain circumstances, badly damaged and contaminated by a continuous bombardment with electrons. In the scanning electron microscope in particular, the dwell period at individual sample regions should be kept as short as possible because otherwise there is a risk of the sample charging locally, which prevents satisfactory imaging qualities.

Various efforts have been undertaken to optimize the imaging process. By way of example, US2008/0152207 A1 describes a method according to which the slices of a sample are sought after and captured in overview images via an image recording apparatus. The search for regions of interest then does not occur in the specimen, but retrospectively on the image thereof. A disadvantage of the method is that, in terms of their lateral resolution, the individual regions of interest are restricted to the resolution at which the overview images of the individual slices were created. Vicidomini et al (Vicidomini et al., High Data Output and Automated 3D Correlative Light-Electron Microscopy Method, Traffic 2008; 9: 1828-1838) describes a method which addresses this problem. According to this, the sample is likewise initially captured in image form via the thinnest individual images and the individual images are subsequently assembled to form a higher-resolution mosaic image. In this mosaic image, the image information corresponding to the regions of greatest interest is subsequently extracted from the mosaic image in a manual process and the image stack is then reconstructed to form a three-dimensional volume, i.e. an image data volume. Although this approach achieves an increased lateral resolution, the manual search within the individual slices for corresponding regions remains extremely complicated in the case of up to several hundred slices per sample. As a result of the long recording times, this method moreover takes a very long time and generates huge amounts of data.

SUMMARY

Proceeding from this, it is an object of the present invention to specify solutions according to which regions of interest can be imaged in high resolution in a series of slices while avoiding the above-described disadvantages.

According to the invention, this object is achieved by a method for magnified imaging of samples, a device for magnified imaging of samples and by a computer program product, which causes at least one device of the aforementioned type to carry out the aforementioned method.

A method for magnified imaging of samples according to one aspect of the invention comprises a procedure, in which, in the case of a plurality of slices, at least two mutually adjacent slices of a sample, which are present on at least one sample carrier, are imaged in a magnified fashion using a device for magnified imaging of samples. Here, the sample carrier is connected to the device via a sample-carrier receptacle and the position of the sample-carrier regions, imaged during the imaging of the slices, in relation to the device and the utilized magnification level are established. Local coordinate systems specific to the respective slice are defined via at least one selected feature contained in the image information of the slices imaged in a magnified fashion, more particularly via at least one suitable contour and/or structure, for the at least two slices imaged in a magnified fashion. At least one region of interest (selection region) is selected within at least one of the slices imaged in a magnified fashion and the relative position of the selection region with respect to the local coordinate system defined for the respective slice and the position thereof in relation to the device are established. Subsequently, the relative position of this selection region is transferred into the local coordinate system of the at least one further slice imaged in a magnified fashion, as a result of which at least one corresponding neighboring region is set on this slice, the position of which neighboring region in relation to the device can be established. In this manner, selection region and/or neighboring region can be targeted, preferably at a high magnification, in an automated fashion and imaged in a magnified fashion.

As a result of defining local slice-specific coordinate systems, the automated transfer of one region of interest to further slices of the same sample is made possible in a very simple fashion. The very laborious manual finding and searching of the regions, situated adjacent to a region of interest, on further slices of the sample becomes superfluous using the proposed method.

As a result of establishing the positions of selection region and/or neighboring region in relation to the device, the automated imaging of these regions, particularly at a higher magnification, and hence with maximized lateral resolution, is made possible. The method according to the invention significantly reduces the period of time during which the slices to be examined have to be exposed to imaging radiation, leading to reduced damages and better imaging results.

The proposed method is suitable for a multiplicity of samples. In particular, it is suitable for biological samples. By way of example, it is possible to image complete organisms or parts thereof, in particular cells or parts of cells, tissues or swathes of tissue. Here, this can be living or dead material. The sample can be present in a fixed fashion. By way of example, the fixing can be brought about by fast freezing or by chemical approaches, for example using paraformaldehyde or glutaraldehyde, or else by a combination of these two methods. However, all other feasible fixation methods are also possible. In other applications, the sample can be marked, more particularly marked by fluorescence or colored in another fashion. Specific biological marks, for example of specific structures on the sample surface or in the sample volume, are also possible. The marking can relate to the sample surface or to the greatest part of or the complete sample volume. The sample can be present in an embedded fashion. The embedding may have taken place using an artificial resin, more particularly an acrylic resin, or else paraffin. However, any other type of embedding is just as possible. The sample can be stained in advance, particularly for electron microscopic examinations.

According to one aspect of the method, it is also possible to introduce at least one artificial structure into the uncut sample; feasible in this case are a solid structure or a hollow structure such as, for example, at least one bore. Hollow structures in particular, such as for example bores, are advantageous in that they generally have a good contrast when using the various devices imaging in a magnified fashion. The structure is preferably configured in such a way that it defines a global three-dimensional coordinate system which is valid for the whole sample volume or for a large part thereof. If such a structure is also cut, it remains visible and detectable as an artificial two-dimensional pattern in the slices. According to a preferred variant of the method, the two-dimensional pattern is selected as a feature for defining local coordinate systems. According to a further preferred variant of the method, the slices are axially assigned to their original slice planes by comparing the respective characteristic two-dimensional patterns of the structure(s) which is/are also cut. Such an assignment or sort preferably takes place by computation, for example by minimizing the differences in the features, in particular by cross-correlation.

Manual correction options can be provided within the scope of the computer-assisted sort. According to one application, provision can be made for a selection option prior to the sort step, which selection option renders it possible for the user to select and/or deselect individual slices which should be sorted and/or which should be excluded from the sort. According to a further application, imaged slices, which could not be computationally sorted or could only be computationally sorted with uncertainty into the sort sequence of the imaged slices, are marked and output to the user as not sorted or unreliably sorted. The user is given the option of manually sorting the slice or of discarding it. Furthermore, provision can be made for the user to select at least one portion of interest in the sorted imaged slices and for the remaining imaged slices to be discarded.

At least three bores, e.g. laser bores, are preferably introduced into the sample volume. According to one variant, the three bores can be introduced at mutually predetermined angles, respectively obliquely to the slice plane, into the uncut sample such that the bores define a global three-dimensional coordinate system which is valid for the whole sample volume or for large parts thereof. The three bores are particularly preferably arranged in an approximately tetrahedral fashion, to be precise in such a way that the bores enter the sample on one sample side near the outer sample edges and emerge from the sample on the opposite side in such a way that the extended bore axes intersect clearly outside of the sample volume. Hence the bores form a unique two-dimensional pattern in each slice plane of the sample, which pattern changes from plane to plane in terms of the dimensions thereof. Such a pattern is ideally suited to sort the slices of a sample. The pattern recognition is preferably undertaken computationally with conventional algorithms and, for example by minimizing the pattern differences, the slices of one sample are associated with their original slice planes and hence sorted.

According to a further preferred variant, the two-dimensional pattern of a structure introduced into the uncut sample, which structure can be seen when observing the slice surfaces of a sliced sample, is additionally used to calculate displacements or distortions of the slices. The deviation of the two-dimensional pattern on a slice from the original shape thereof, as was present during the introduction of the at least one structure into the sample, is established and extrapolated onto the imaged slice or onto regions of the slice and the slice is rectified. Displacements or distortions can be created when cutting the sample and/or when transferring the slices to the sample carrier and, under certain circumstances, make the registration of the slices to form an image stack significantly more difficult. As mentioned previously, three bores with a predetermined cross section are preferably selected and introduced into the sample at predetermined angles with respect to one another. As a result, each slice plane is associated with a specific calculable two-dimensional pattern of the three bores. The displacements and/or deformations in the arrangement of the three bores with respect to one another and/or in the cross sections thereof, identified by comparing the two-dimensional pattern as present on a specific slice with the calculated pattern, are, for example while registering a plurality of slices to form an image stack, extrapolated onto the slice or regions of the slice and the slice is thereby rectified computationally. The computational rectification of the image data of individual slices preferably takes place using known algorithms.

According to a further aspect of the method, the global three-dimensional coordinate system preferably fixed with the introduction of the structure also supplies information in respect of the distance between two slice planes in addition to information in respect of the slice plane of a slice. The structure is configured in such a way that significant pattern differences of the two-dimensional patterns of this structure can be detected by various microscopy systems, in particular by optical microscopy systems and particle beam microscopy systems, for slice planes distanced from one another by less than 1000 nm. Pattern differences are preferably detectable for slice planes distanced from one another by less than 200 nm, particularly preferably by less than 100 nm. It is preferable for bores to be introduced into the sample which are selected to be sufficiently thin and which are introduced into the sample at an angle with respect to one another such that the aforementioned preferred variants are satisfied in an executable fashion. By way of example, use is made of bores with a diameter of between 0.2 µm and 5 µm, which are preferably introduced at an angle of greater than 20°, particularly preferably of 30°, with respect to one another. Differences in the dimensions of the patterns measured when imaging the two-dimensional pattern of two slices of a sample are converted into the distance that the slice planes of the two slices have with respect to one another. This slice-plane distance varies depending on the specific slice thicknesses. During the three-dimensional reconstruction of the imaged slices, the slice-plane distance can also be included in the calculation and therefore renders possible a significantly more accurate reconstruction than is possible using a fictitious slice-plane distance which is assumed to be the same for all slices. Local compressions or expansions of the three-dimensional reconstruction item, which necessarily occur if a fictitious slice-plane distance is used as the basis for the calculation, are thus prevented.

In a further embodiment of the method, particularly in the case of particle beam microscopic imaging of the slices, the bore-hole diameters of at least one bore extending obliquely through the sample with respect to the slice plane are measured. Since the bore also extends at an angle through the slices, the boreholes differ in their diameter depending on the specific slice thicknesses of the slices in the through-view as captured by the imaging device. The measured diameter and the angle at which the bore was introduced are used to calculate the slice thickness of the imaged slice. The established slice thicknesses of a plurality of slices of a slice series render possible a once again increased accuracy during the three-dimensional reconstruction compared to a fictitious slice-plane distance assumed to be the same for all slices.

Further subjects of the present invention are illustrated under the following numerals (1) to (18), wherein the subjects can be combined amongst themselves and each of these subjects can be combined with the above-specified subjects.

(1) Method for magnified imaging of samples, wherein
  a) at least one artificial structure is introduced into a sample volume, wherein the structure defines a global coordinate system valid for at least most of the sample volume,
  b) the sample or part of the sample is cut into a plurality of thin slices, wherein the artificial structure is detectable in the plurality of the slices as a two-dimensional pattern, and
  c) at least one of the slices is present on a sample carrier and imaged in a magnified fashion by a device for magnified imaging of samples, wherein the two-dimensional pattern of the at least one structure artificially introduced into the sample is evaluated, and, by comparing the established values with the global coordinate system, it is possible to determine the original position of the at least one slice, imaged in a magnified fashion, in the sample.

(2) The method according to numeral (1), characterized that at least three slices of the sample are imaged in a magnified fashion and the images are sorted according to the original positions of the imaged slices in the sample, wherein the sort is brought about by minimizing the pattern differences.

(3) The method according to numeral (1) or (2), characterized in that the at least one structure artificially introduced into the sample is formed by at least one hollow structure.

(4) The method according to numeral (3), characterized in that the hollow structure is formed by at least three bores, which are introduced into the sample at angles set with respect to one another, and in that these bores define respectively local coordinate systems for at least some of the slices in the sample.

(5) The method according to numeral (4), characterized in that the bores enter the sample on one sample side near the outer sample edges and emerge from the sample on the opposite side in such a way that the extended bore axes intersect clearly outside of the sample volume, wherein the bores form a unique two-dimensional pattern in each slice plane of the sample, which pattern changes the dimensions thereof from plane to plane.

(6) The method according to numeral (4) or (5), characterized in that the bore(s) are introduced into the sample via a laser.

(7) The method according to one of the preceding numerals, characterized in that at least two slices of a sample are imaged in a magnified fashion, wherein the sample carrier is connected to the device via a sample-carrier receptacle, and wherein the position of the imaged sample-carrier regions is captured in relation to the device and the utilized magnification level, in that at least one region (selection region) is selected within at least one of the sections imaged in a magnified fashion and the relative position of this at least one selection region with respect to the local coordinate system defined for the respective slice and the position thereof in relation to the device are established, in that the relative position of this at least one selection region is transferred into the local coordinate system of the at least one further slice imaged in a magnified fashion in order to set at least one corresponding neighboring region on this section, in that the position of the neighboring region is established in relation to the device, and in that the at least one selection region set in advance and/or the at least one corresponding neighboring region is/are targeted, preferably at a high magnification, by the device and is/are imaged in a magnified fashion.

(8) The method according to numeral (7), characterized in that the at least one selection region imaged in a magnified fashion forms at least one image series with its respective neighboring region(s), which image series is wholly or partly assembled to form a three-dimensional volume.

(9) The method according to numeral (7) or (8), characterized in that use is made of a sample carrier to which at least one adjustment mark is attached, in that a global reference system valid individually for the sample carrier is established by virtue of the adjustment mark being imaged in a magnified fashion and the position of the adjustment mark in relation to the device being stored, and in that the relative position of selection and/or neighboring region(s) in respect of the adjustment mark are stored.

(10) The method according to numeral (9), characterized in that data captured during the imaging of the slices, the selection region(s) and/or neighboring region(s), in particular local and/or global positional data, are completely or partly transmitted to at least one further device for magnified imaging of samples, in that the at least one sample carrier is connected to the at least one further device for magnified imaging of samples and at least one of the previously imaged selection and/or neighboring region(s) is targeted and imaged in a magnified fashion by the at least one further device for magnified observation of samples.

(11) The method according to numeral (10), characterized in that the at least one selection region imaged in a magnified fashion via the at least one further device for magnified imaging of samples and/or the respective neighboring region(s) thereof form(s) at least one image series, which is wholly or partly assembled to form a three-dimensional volume.

(12) The method according to numeral (10) or (11), characterized in that the selection and/or neighboring region (s) respectively imaged in a magnified fashion in the various devices for magnified imaging of samples are correlated to one another in pairs and image data correlated by computation are generated.

(13) The method according to one of numerals 10-12, characterized in that at least one portion is selected within at least one selection or neighboring region previously imaged by via the first or the further device for magnified imaging of samples, in that the relative position of the portion is established in relation to the respectively defined local coordinate system in relation to the adjustment mark, in that the relative position is transferred into the local coordinate system of at least one further slice imaged in a magnified fashion in order to set at least one corresponding neighboring portion on this slice, in that the position of the neighboring portion is established in relation to the adjustment mark, in that the portion and the corresponding neighboring portion are targeted by the further device and, preferably at high resolution, imaged in a magnified fashion, and in that the portion with its neighboring portion(s) forms at least one image series, which is wholly or partly assembled to form a three-dimensional volume.

(14) The method according to one of the preceding numerals, characterized in that the two-dimensional pattern of the artificial structure, as present on a specific slice, is compared with the calculated pattern of the plane from which the slice originates, and the identified displacements and/or deformations in the arrangement of the structure are extrapolated onto the slice or onto regions of the slice and the slice is thereby rectified.

(15) The method according to one of the preceding numerals, characterized in that pattern differences between the two-dimensional patterns in the artificial structure are detectable for slice planes of a device for magnified imaging of samples, which slice planes are distanced from another by less than 1000 nm, preferably by less than 200 nm, particularly preferably by less than 100 nm.

The method according to the invention demands that an untreated sample or a treated sample, as already illustrated above in an exemplary manner, is present in the form of at least two slices on at least one sample carrier. However, it should be mentioned that the proposed method can process an unlimited number of slices.

The number of slices per sample is only limited by the size of the sample and the minimal achievable slice thickness. The preferred thickness of the slices generally depends on the selected imaging type. In general, thin slices are preferred. The thickness of the slices particularly preferably lies within a region of between 10 and 1000 nm. The individual slices are preferably obtained by more or less parallel cutting of the sample into thin sections. When slices are discussed in the present context, such thin sections are meant. The slices can be obtained by hand, for example by using a scalpel or a blade, or via a microtome, for example a sled microtome or a rotary microtome, a vibrating microtome or a laser microtome. All types of microtomes or ultramicrotomes are feasible. According to a preferred embodiment of the method, a series of slices is produced and the slices of the series are consecutively arranged on one or more sample carriers in the sequence of their slicing.

The method according to the invention renders possible the use of all types of sample carriers. However, the utilized sample carrier is preferably adapted to the respectively utilized imaging method. By way of example, if the slices are imaged using a light microscope, the slices can, according to one application, be arranged on a conventional object carrier. According to another application, a cover slip can be used as a sample carrier. By way of example, if the slices are imaged by a particle beam microscope, it is necessary to select a sample carrier which is suitable for particle beam microscopy. The suitability for particle beam microscopy requires that the sample carrier is electrically conductive and preferably not magnetizable or magnetizable only within tolerable, predetermined limits. By way of example, use can be made of a so-called sample grid, which is often used in transmission electron microscopy, for particle beam microscopic imaging. An electrically conductive and transparently coated cover slip or a wafer is likewise suitable.

The slices arranged on the sample carrier or carriers can be imaged without further treatment. The slices are preferably subjected to further treatment before being imaged. In some applications, the slices are, for example, colored or stained after being arranged on the sample carrier. The coloring can comprise a number of coloring steps, for example coloring and counter-coloring. Staining is brought about either in such a way that target structures are stained (positive staining) or in such a way that the surroundings of the target structures are stained (negative staining) In other applications, specific structures are marked within the slices, for example on a subcellular level. The marking can relate to various substrates, for example DNA, RNA, peptides, proteins, protein complexes, lipids or so-called small molecules. By way of example, marking can be brought about using different fluorescent dyes, nanoparticles or enzymatically active proteins or protein complexes. The marking can take place in a conjugated, for example antibody-mediated, fashion by hybridization or by direct binding of the marker substance to the substrate. In marking reactions set in sequence, it is possible to make different structures visible using different marks. In a specific application, it is also possible to image the marked slices according to the proposed method and thereafter elute the mark from the slices in order subsequently to mark further structures in a new marking reaction and to image the slices again. In a further specific application, it is also possible to image the slices without treatment initially, thereafter treat the slices and subsequently image them again.

What is essential to the proposed method is the connection of the at least one utilized sample carrier in the device. The connection can be brought about by all feasible known approaches, for example by clamping or by screwing. The connection is preferably brought about in such a way that the sample carrier is present in a spatially fixed manner in the device.

The at least two slices present on the at least one sample carrier are preferably targeted manually and imaged in a magnified fashion. However, it is just as possible to configure this imaging process to be automatic. By way of example, this can be brought about by the automated recording of partly overlapping individual images, which are preferably all created with the same magnification, wherein the position and resolution of at least one individual image must be captured in relation to the device. The individual images can subsequently be assembled to form a mosaic image, which wholly or partly images the slices present on the sample carrier.

The slices are preferably imaged using the same microscopic stain as in the subsequent imaging of the selection and/or neighboring regions. However, it is just as feasible for the imaging of the slices to take place with deviating staining. According to a preferred embodiment of the method, the imaging device uses visible light for imaging purposes. By way of example, according to some applications, the slices are imaged using phase or dark field contrast, whereas the later imaging of the selection and/or neighboring regions for example takes place using fluorescent excitation.

Any feasible feature on the imaged slices can be selected for defining the slice-specific local coordinates systems. However, it must be suitable for defining local coordinates systems. The suitability requires that a selected feature extends over the imaged slices and that the selected feature is pronounced with relative constancy on the imaged slices. The selected feature preferably largely has relative constancy throughout the sample volume. This ensures that the local coordinate systems only differ insignificantly from slice to slice, which simplifies the calculation of neighboring regions on further slices of the same sample. The combined selection of different features is also possible. The selection is preferably brought about in an automated fashion by the device.

In particular, the selected feature can be at least one contour and/or structure. By way of example, the method can be configured to the effect that outline structures of the imaged slices are selected for defining the local coordinate systems. In this case, the uncut sample is preferably at least partly colored or stained in a different manner in order to achieve better staining of the slice outlines in the image. According to one aspect of the method, the uncut sample is at least partly colored using a fluorescent dye in order also to be able to detect the slice outlines in fluorescence contrast. The outlines are preferably identified computationally using conventional algorithms, such as, for example, the Canny algorithm or phase-coherence based algorithms.

The user can be left the option of selecting a feature or a combination of features for calculating local coordinate systems on the slices. The user can select as features outline structures or structures from the sample itself or, at the same time, also select outline structures and structures from the sample.

Selecting a slice outline offers the advantage of a contrast which is usually high, which also simplifies the examination of relatively poor contrast slices.

In a further step, the selected features serve to obtain information which can be used to calculate local coordinate systems.

One option for obtaining robust information from the selected feature consists of extracting edges from the magnified image using a suitable method. This can occur using various edge detectors, for example a Canny edge filter. One option for increasing the reliability consists of matching the filter or filters used for the extraction to the edge structure typically to be expected of the recorded contrast in order to optimize the filter response in relation to dirt and noise.

One option for mathematical calculation of the local coordinate systems on the basis of the extracted information while optimizing a similarity measure consists of the Fourier-Mellin correlation (B. S. Reddy and B. N. Chatterji, "An FFT-Based Technique for Translation, Rotation, and Scale-Invariant Image Registration", IEEE Trans. Image Processing, vol. 5, no. 8, pp. 1266-1271, August 1996). Further embodiments based on alternative optimization methods such as the Levenberg-Marquardt method or based on local feature points are also feasible. In order to achieve a high processing speed while at the same time having a high accuracy of the calculated coordinate systems, it is possible, in the process, to carry out the calculation on different image scales. Here, local coordinate systems in a large search region are initially calculated on an image with a low resolution. The result is subsequently utilized to initialize a calculation method on a higher resolution image. The result of the calculation is the displacement, rotation and scaling of the local coordinate systems with respect to one another.

Non-discriminative structures, which interfere with the calculation of local coordinate system, can be suppressed in one development of the method. One option consists of removing edge regions which consist of less than a predetermined number of contiguous pixels and discarding these in further calculations.

In one development of the method, two-dimensional patterns of artificial structures introduced into the uncut sample are selected as features. The structures artificially introduced into the uncut sample can, as already described further above, comprise solid or hollow structures. In particular, bores are preferred according to the invention, as likewise already described in detail further above. Such structures are preferably introduced into the uncut sample in such a way that the two-dimensional patterns thereof on the slices appear relatively constant on the slices and for example only differ insubstantially or do not differ at all from slice to slice. It is preferable for at least three bores to be introduced into the sample volume, particularly preferably parallel to one another and at a spatial distance from one another, i.e. not on one line. The sample is then cut approximately perpendicular to the introduced bores such that the bores for example form a two-dimensional pattern in the slice plane, which pattern marks the three tips of an imagined triangle. Such an arrangement of the bores is ideally suited to being a feature to be used to define a two-dimensional local coordinate system. As a result of the parallel nature of the bores, the two-dimensional patterns of the bores only differ insubstantially or do not differ at all from slice to slice. Accordingly, the local coordinate systems defined therefrom only differ insubstantially or do not differ at all from slice to slice, which substantially simplifies the later transfer of a selection region from one slice to a further slice as corresponding neighboring region and increases the accuracy of the transfer.

In a development of the method, it is also possible for imaged slices to be sorted on the basis of the features selected for calculating the local coordinate systems and/or on the basis of further features. By way of example, the sort can take place an automated fashion by minimizing the differences in the features such that the sort sequence reproduces the original positions of the slices in the sample. The feature differences are preferably minimized by calculation using conventional algorithms, for example by cross-correlation. It is regularly hardly possible to sort damaged slices. It is for this reason in particular that manual correction options can be provided for within the scope of the sort. According to one application, a selection option can be provided prior to the sorting step, which selection option renders it possible for the user to select and/or deselect individual slices which should be sorted and/or which should be excluded from the sort. According to a further application, imaged slices, which could not be computationally sorted, or could only be computationally sorted with uncertainty, into the sort sequence of the imaged slices, are marked and output to the user as not sorted or unreliably sorted. The user is given the option of manually sorting the slice or of discarding it. The method according to the invention can furthermore provide for the user to select at least one portion of interest of the sorted imaged slices and for the other imaged slices to be discarded.

The selection of the at least one selection region can take place manually or in an automated fashion. According to one embodiment of the method, the selection region is preferably selected manually on the at least one imaged slice. An option is preferably provided for the user to specify the selection in a spatially more precise fashion, particularly at high magnification, or to discard said selection. To this end, the selection region is targeted at a high magnification and imaged in a magnified fashion. The user can therefore evaluate the selection region at a high magnification, and modify or discard it. According to another embodiment of the method, the selection region is identified in an automated fashion. The automated identification preferably takes place on the basis of specific, for example subcellular, target structures such as, for example, cell nuclei, mitochondria, chloroplasts etc. or on the basis of specific, for example optical, signals such as fluorescence signals. Manual correction options are preferably provided for within the scope of the automated selection of selection regions, which manual correction options render possible a subsequent specification in a spatially more precise fashion or discarding of the selected region.

The relative position in relation to the local coordinate system defined for the imaged slice is established for the selected region. The position of the selection region in relation to the device is established and stored taking into account this relative position in relation to the slice, the position of the imaged slice in relation to the device and the magnification scale used for imaging the slice.

The relative position of the at least one selection region is transferred into the local coordinate system of at least one further slice, as a result of which at least one corresponding neighboring region is set therein. The transmission is preferably brought about in an automated fashion, for example by a coordinate transformation. The method can be configured to carry out the transfer of the relative position into the local coordinate systems of all further imaged slices. In another application, that transfer takes place restricted to a portion of the imaged slices. The transfer preferably only takes place onto slices which were marked by a user in advance. In a further application, the transfer only occurs onto slices which correspond to specific predefined criteria. The transfer is preferably brought about to slices which are distanced within predetermined limits from the slice on which the selection region lies.

The position of the neighboring region in relation to the device is established and stored taking into account the relative position of the neighboring region within the local coordinate system of the at least one further slice, the position of the imaged slice in relation to the device and the magnification scale used for imaging the at least one further slice. Manual correction options are preferably provided for within the scope of the coordinate transfer. In particular, provision can be made for the positions of the automatically established neighboring regions to be correctable. This correction option is of particular importance if sample regions of interest lie at an angle to the slice plane in the sample and hence the positions of selection region and desired neighboring regions differ from slice to slice. In one embodiment of the method, the neighboring regions can be repositioned manually. In a further embodiment of the method, individual neighboring regions can be repositioned manually. The positional correction of the uncorrected neighboring regions situated between the selection region and a repositioned neighboring region or between two repositioned neighboring regions can be brought about by calculation, for example by interpolation. The repositioning can take place on the imaged slice or else after the neighboring region to be corrected was targeted with an increased magnification.

Since the proposed method provides positional information in respect of selection region(s) and/or neighboring regions in relation to the device, the selection and/or neighboring region(s) are preferably imaged automatically. To this end, the selection and/or neighboring region is targeted by the device, preferably with high magnification, and imaged in a magnified fashion. Manual correction options are preferably provided for within the scope of imaging the selection and/or neighboring regions. In particular, provision can be made for it to be possible to correct the image section and/or image recording parameters, more particularly the focus position, manually by the user after a selection or neighboring region was targeted. Provision can likewise be made for the user to obtain the option of carrying out corrections, in particular with regard to the image section and/or the image recording parameters, after first imaging of the selection and/or neighboring region. Then, a second image, which is corrected by the corrected parameters, is generated and stored in place of or in addition to the first image. Provision can be made for completely or partly applying the corrections undertaken on a specific selection and/or neighboring region to the further selection and/or imaging region(s) to be imaged, for example by virtue of the corrections being interpolated to the further selection and/or neighboring region(s) to be imaged. The changes in the coordinate data connected with a correction of the image section are preferably stored. A correction option for the image section is particularly important if regions of interest lie at an angle in the sample volume and hence a region of interest and the neighboring regions thereof are positioned differently laterally, depending on the slice plane of the respective slice. The method according to the invention can provide for some of the corresponding neighboring regions, which image a region lying at an angle in the sample volume, to be corrected in terms of their position and the corrections to be interpolated to slices lying therebetween. Each individual neighboring region of a series of neighboring regions could just as well also be corrected.

The method can be configured to the extent that an imaged selection region and the respective neighboring region(s) thereof are respectively wholly or partly registered to form image stacks and these image stacks are then wholly or partly assembled to form three-dimensional volumes. The registration preferably takes place in a pair-wise fashion between neighboring corresponding regions, wherein the imaged selection region preferably serves as a reference image, which is compared to the closest imaged neighboring region and wherein the process is repeated with each sequential imaged neighboring region which belongs to the image series. Predetermined features within the imaged regions particularly preferably serve as orientation points and this simplifies the registration of the image data. In particular, the two-dimensional patterns of artificial structures introduced into the uncut sample come into question as features. To the extent that these are introduced into the sample in a predetermined fashion, the two-dimensional patterns of each slice image necessarily likewise have a predetermined geometry. By computational comparison of the predetermined geometry with the geometry actually found on the slice, it is possible to identify distortions and extrapolate these into at least portions of the slice, as a result of which the slice is at least partly rectified. The subsequent three-dimensional reconstruction of the image data to form a three-dimensional image data volume is preferably brought about computationally using conventional algorithms such as cross-correlation, disparity analysis or rendering algorithms, in particular volume rendering or surface rendering.

In a development of the method, use is made of a sample carrier which is provided with at least one adjustment mark which fixes a global coordinate system individually valid for the sample carrier. The adjustment mark is preferably targeted and imaged in order to establish the position of the adjustment mark in relation to the utilized device. It is particularly preferable for the positions of slices on the sample carrier and of selection and/or neighboring regions to likewise be established in relation to the coordinate system fixed by the adjustment mark in order to enable the problem-free interchange of the sample carrier between various devices. If the sample carrier is supplied to a further device for magnified imaging of samples, and if the latter is used to establish the position of the adjustment mark in respect of the further device, it is possible, to the extent that a corresponding coordinate data interchange occurs between the devices, for all slices and selection and/or neighboring region(s) imaged previously with the first device to be targeted and imaged in an automated fashion by the further device. The user does not have to bother with re-finding previously defined regions in the second microscope. The coordinate data transmitted from the first device must merely be converted with respect to the further device, preferably using a coordinate transformation. It is furthermore advantageous that, as a result of transmitting the positional data of, in particular, the selection and neighboring regions, these can be targeted directly by the further device without it being necessary once again to image the slice overviews and define local coordinate systems using the second device. As a result, this reduces the recording times, which increases the imaging quality because the slices are damaged less.

According to a preferred embodiment of the method, the slices and/or the selection and/or neighboring regions arranged on a sample carrier are imaged using a light-microscopic imaging device and, previously or thereafter, using a particle beam microscopic imaging device. Within the meaning of this description, light microscopy is understood to mean any microscopy method which uses radiation obeying the laws of optics, more particularly in the visible range, i.e. light, for imaging purposes. Within the meaning of this description, particle beam microscopy is present if imaging takes place via a beam of charged particles such as e.g. electrons or ions, for example in the form of electron beam microscopy or ion beam microscopy. In this case, the sample carrier must be suitable for both light microscopy and particle beam microscopy. The suitability for particle beam microscopy requires that the sample carrier is electrically conductive and preferably not magnetizable or magnetizable only within tolerable, predetermined limits. The sample carrier is preferably configured in such a way that a sample-carrier element, e.g. a conventional or electrically conductive and transparently coated cover slip or, alternatively, a conductive grid, can be placed over a window preferably formed in the sample carrier. The sample-carrier element carries the sample or the slices and can be fixed over the window, preferably via an attachment apparatus. As a result of this fixation, the object is affixed to the sample carrier and can be examined with both light microscopy and particle beam microscopy without embedding to a different carrier being required. The sample-carrier element is preferably clamped into the sample carrier via a spring. In this case, the sample carrier is preferably configured in such a way that a recess which fits the object-carrier element is provided on the top, into which recess the object-carrier element can be inserted with a secure fit and can subsequently be fixed in a clamping manner by via the spring, wherein the window is arranged centrally under the recess for the object-carrier element. Any resilient material is suitable as spring material provided that it is electrically conductive and preferably not magnetizable or magnetizable only within tolerable, predetermined limits. The sample carrier is preferably equipped with at least one adjustment mark, as mentioned previously. Use is particularly preferably made of three adjustment marks, which define a coordinate system valid for the sample carrier. The adjustment marks are preferably selected as L-shaped marks. The mark is preferably provided for as a double mark, wherein the one mark preferably is the larger repetition of the smaller mark. This ensures simpler recoverability of the adjustment mark. The fine calibration of the microscope-side mechanism is preferably ensured by the smaller one of the two marking structures. The clear space of the smaller passage structure is preferably between 0.5 µm and 50 µm, particularly preferably between 2 µm and 20 µm, wide and is preferably introduced into the marker film via laser engraving. The adjustment mark(s) can be embodied as passage structures through the sample carrier. In a preferred embodiment, the adjustment marks are introduced into marker films as passage structures, which are placed centrally above openings in the sample carrier. In the sample carrier, recesses are preferably provided centrally above the openings into which the marker films can be inserted such that they fit. The marker films are preferably welded to the sample carrier.

In a development of the method is possible to set at least one portion of interest within a previously imaged selection or neighboring region. By transmitting the position thereof to at least one further slice, at least one neighboring portion is fixed there. The transmission of the positional data takes place in the manner already described above for the transmission of the selection regions on the basis of the local coordinate systems respectively defined for the selection or neighboring regions. After the relative position with respect to the at least one adjustment mark has been established, portion and neighboring portion(s) can be directly targeted and imaged by the further device in an automated fashion. However, the method can also be configured in such a way that selection and/or neighboring regions are imaged by the further device before fixing a portion and the portion is only fixed on the basis of these images.

Selection and/or neighboring regions or portions and/or neighboring portions are preferably targeted and imaged by the further device in an automated fashion. Correction options can be provided prior to or after the imaging. In particular, provision can be made for the user to be able to correct the image section and/or image recording parameters, more particularly the focus position, manually after a selection region, neighboring region, portion or neighboring portion was targeted. Provision can likewise be made for the user to be provided with the option of carrying out corrections, in particular on the image section and/or on the image recording parameters, after first imaging of the selection region, neighboring region, portion or neighboring portion. Then, a second image corrected by the corrected parameters is created and stored in place of or in addition to the first image. Provision can be made for the corrections undertaken at a specific selection region, neighboring region, portion or neighboring portion to be wholly or partly applied to the further selection region(s), neighboring region(s), portion(s) or neighboring portion(s) to be imaged, for example by virtue of the corrections being interpolated to the further selection region(s), neighboring region(s), portion(s) or neighboring portion(s) to be imaged. The changes in the coordinate data connected with a correction of the image section are preferably stored.

According to a preferred embodiment, at least two images of at least one region are present; one was created by the first device and the further one was created by the further device. These images created by the various devices are correlated to one another in a pair-wise fashion according to one development of the method, i.e. the two data records are superposed and output in a resultant correlative image data record.

According to a further preferred variant of the method, provision is made for a series of images, created by the second device, of a plurality of imaged corresponding neighboring regions including or excluding the corresponding selection region to be correlated by computation with the corresponding series of images from the further device. The correlation results in a correlative image stack. Within the meaning of the computational correlation, provision can be made for manual correction options such as, in particular, manual re-adjustment options in respect of the superposition.

Provision can furthermore be made for a correlative image stack to be reconstructed to form a three-dimensional image data volume. The reconstruction of the image data to form a three-dimensional image data volume is preferably brought about computationally via conventional rendering algorithms, which in particular comprise volume rendering or surface rendering methods.

It is understood that changes in the sequence of the individual method steps in particular count as also being comprised by the present invention.

Within the scope of the invention, provision is also made for a device for magnified imaging of samples. The device according to the invention comprises at least one receptacle apparatus for a sample carrier, at least one controllable component and a computer apparatus, wherein the components of the device are configured to carry out the method according to the invention.

In particular, the controllable component of the device is configured to target predetermined positions on the sample carrier; in the present case, the term targeting is understood to mean that predetermined positions on a sample carrier can be directed into the field of view of the device in a targeted manner. In the process, the magnification level is preferably also adapted such that, for example, a selection region is imaged such that it relatively fills the available space. The controllable component is preferably at least one actuation motor, which adjusts a device-side mechanism for moving the sample carrier, for example a sample stage. The current position of the mechanism can preferably be established.

The computer apparatus is more particularly configured to control the at least one controllable component. There preferably is a device-side reference system and the computer apparatus monitors the position of the mechanism for moving the sample carrier in relation to this reference system. Reaching a predetermined position is monitored by a control loop. Furthermore, the computer apparatus is preferably configured to evaluate images or parts of images in respect of establishing individually valid local coordinate systems for these images or image parts, which coordinate systems assign relative positional information to points or regions within the validity of such a coordinate system. The computer apparatus preferably identifies predetermined features in the images, in particular contours and/or structures, in order to define the local coordinate systems, which are individually valid, on the basis of these features.

The computer apparatus is preferably furthermore configured to establish the relative position of points or regions within such a coordinate system, to transfer this relative position to further images with similar coordinate systems and to relate the relative position and/or transferred relative position to further coordinate systems, for example to the reference system of the device. As soon as the established relative positions have been related to the reference system of the device, the relative positions can be targeted in an automated fashion.

A device configured in such a manner is able to transfer a selection region within a slice to neighboring slices in an automated fashion, as a result of which corresponding neighboring regions are defined there. Neighboring regions and/or selection regions can be targeted by the device in an automated fashion and, in particular, be imaged at a high resolution. Setting neighboring regions is made easier thus and is able to be performed very quickly. Moreover, selection and corresponding neighboring regions of interest can be imaged with a high resolution.

The device according to the invention can be configured for magnified imaging using a specific method which images in a magnified fashion. According to one embodiment, the device is configured as a light microscope. According to another embodiment, the device is configured as a particle beam microscope. According to a third embodiment, the device controls different methods which image in a magnified fashion. By way of example, the imaging apparatus can be configured as a combination microscope which commands both light microscopy and also the particle beam microscopy.

The receptacle apparatus for the sample carrier on the device can be embodied in such a way that it holds the sample carrier directly. By way of example, according to one embodiment, provision can be made for a clamping apparatus by which the sample carrier is affixed to the device in a clamping fashion. However, it is just as easily possible to connect the sample carrier indirectly to the device via an intermediate piece or via an adapter, wherein the adapter advantageously has an assembly apparatus for attaching the adapter to the receptacle apparatus of the device and a holding apparatus for affixing the sample carrier.

The at least one controllable component of the device can be configured to displace the sample-carrier apparatus relative to the imaging apparatus. By way of example, the sample carrier can be designed in the form of a sample stage and the controllable component can be configured as an actuator which moves the sample stage. However, it is just as easily possible for the controllable component to be configured to displace the imaging apparatus relative to the sample carrier or to guide an imaging beam. By way of example, the controllable component can be configured to be a deflection coil, which guides an imaging beam to predetermined positions of the sample carrier. Of course, a combination is also possible, in which the at least one electrically controllable component is configured to move both the sample carrier relative to the imaging apparatus and the imaging apparatus relative to the sample carrier. Furthermore, it is also possible to provide a plurality of correspondingly configured controllable components, which together satisfy the function of targeting predetermined positions on the sample carrier.

Advantageous developments of the device are configured in accordance with the developments of the method.

The device can be configured for use according to one aspect or exemplary embodiment of the method.

BRIEF DESCRIPTION OF THE DRAWINGS

In the following text, the invention will still be explained in more detail in an exemplary fashion on the basis of the attached drawings, which also disclose features essential to the invention. In detail:

FIG. 1 shows a flowchart according to one embodiment of the method according to the invention. The goal of the method according to FIG. 1 is to localize with the highest possible resolution a spatial region, which is of interest for a predetermined biological question, of a biological sample present in thin slices on a glass-object carrier, by a light-microscopic approach, wherein the region of interest is present distributed over a plurality of slices of the series of slices.

Figure 1:
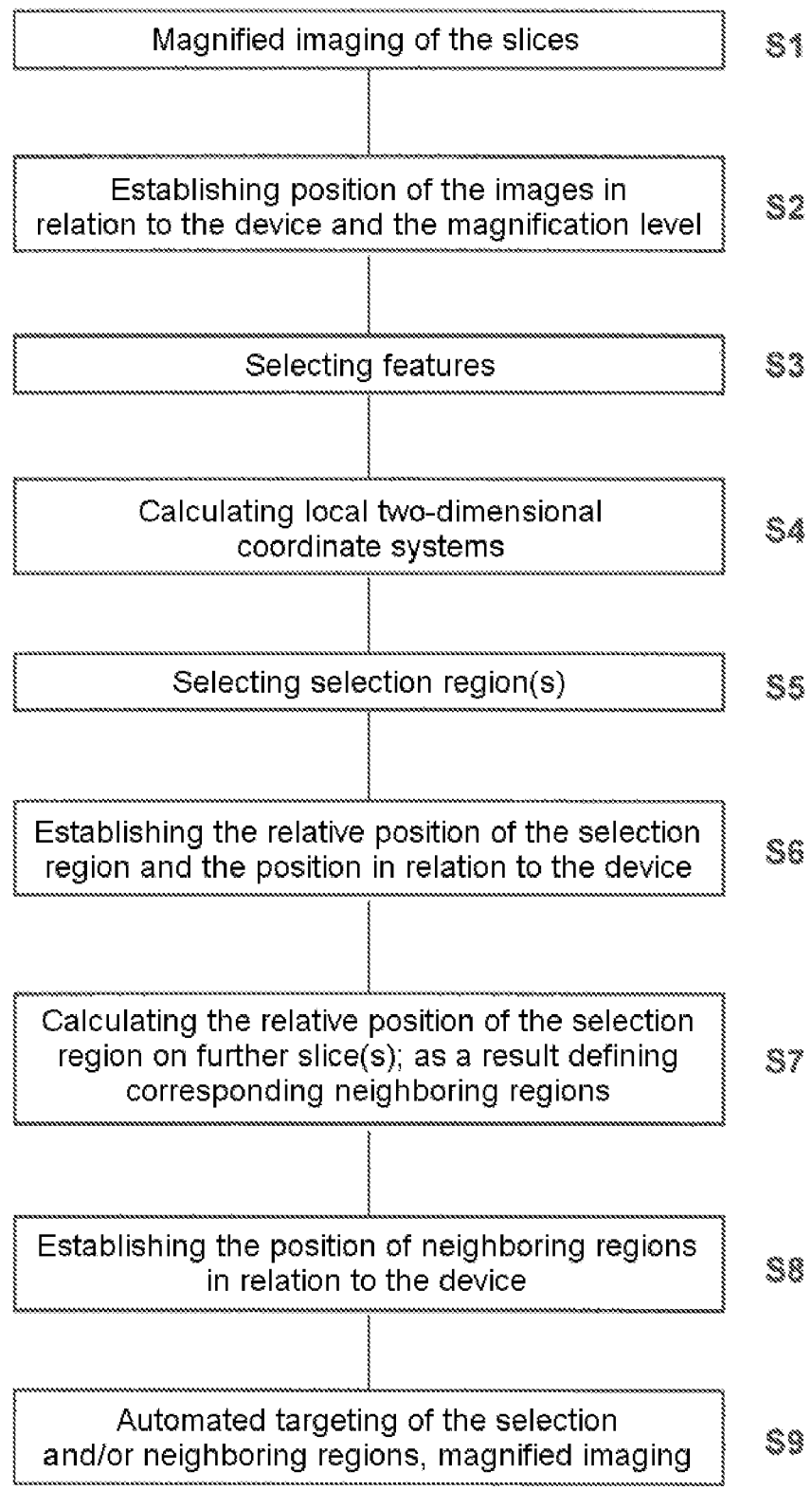
FIG. 1 shows a flowchart of an embodiment of the method according to the invention.

To this end, the slices of the biological sample are first of all imaged by a light-microscopic mechanism in a step S1. The images of the slices are recorded via a digital camera. The utilized microscope is configured to image the individual slices in the bright field, in the dark field, in phase contrast and via fluorescence excitation. Hence it is possible to image the slices in various microscopic contrasts, as a result of which, proceeding from step S1, a plurality of images of the same slice can be available with different microscopic contrasts. The digital image data are transmitted by the digital camera to a computer unit connected to the camera. In the present exemplary embodiment, the computer unit is a personal computer (PC) connected to the digital camera and having connected thereto a monitor for displaying the images. The object carrier is connected in a spatially fixed manner to the light microscope via a sample-carrier receptacle.

In a step S2, the position of the slices in relation to the microscope is established and, just like the utilized magnification level, transmitted to the computer unit and stored there. In the simplest case, the microscope is equipped with a motorized X-Y table and the positions of the slices are established via the positional data output by a stepper motor. Like the digital camera, the light microscope is connected to the computer unit. The computer unit is able to assign positional data to the image data provided by the camera.

In a step S3, a feature or a plurality of features are selected, which, in a step S4, serve(s) to calculate local coordinate systems. Structures with a high contrast in the light-microscopic image are very well-suited to being features. Trials have shown that slice outline structures are particularly well-suited in many cases because they supply robust information as a result of their often high contrast, which information is well-suited to the calculation of the local coordinate systems. The selection of the features according to S3 is designed in such a way that the computer unit is configured to select in an automated fashion features from the provided image data, which features are used to calculate the local coordinate systems. However, manual intervention options are also provided, which give the user the option of manually selecting features on the monitor image or on the basis of a selection menu, or of selecting from a pre-selection, proposed by the computer unit, in an image- or menu-controlled fashion. For the purposes of an automated selection or pre-selection of features, a Canny edge filter is implemented in the computer unit, which filter extracts edges from the magnified image. In order to optimize the filter response in relation to dirt and noise, the Canny edge filter is already preset to edge structures of the recorded contrast which are typically to be expected.

For the mathematical calculation of the local coordinate systems in step S4 is brought about on the basis of the edges extracted from the selected features. This takes place when optimizing a similarity measure, for the purposes of which the the computer unit uses the Fourier-Mellin correlation. In order to achieve a high processing speed while at the same time having a high accuracy of the calculated coordinate systems, the computer unit is moreover configured to carry out the calculation on different image scales. Here, local coordinate systems are initially calculated on the basis of the low resolution image recorded in S1. Subsequently, the result is used to initialize a calculation method on a further higher resolution image of the selected feature. The computer unit is furthermore configured to suppress non-discriminative structures, which interfere with the calculation of local coordinate systems. This is brought about by virtue of removing edge regions which consist of less than a predetermined number of contiguous pixels and discarding these in the further calculation.

A selection region is selected on one of the slices in a step S5. This selection region represents a planar section of the spatial region of interest of the biological sample. This can be brought about manually by the user by manual observation of the images from step S1 on the monitor or in an automated fashion. The automated selection of the selection region is brought about in an analogous fashion to the selection of features in step S3 via edge filters or other algorithms optimized for the respective selection problem, which other algorithms are likewise implemented in the computer unit. Depending on the examination problem, the selection regions can of course be of a very different nature. By way of example, it is a common desire of the user to localize specific molecular target structures such as proteins, DNA or RNA in slices of biological sample material. The desired target structures are often marked in advance, for examples fluorescence marked, in order to ease the detection thereof. With the implemented filters, the computer unit is able to identify target structures marked in such a way and to set these as selection regions.

In a subsequent step S6, the relative position of the selection region fixed in the step S5 is established in relation to the local coordinate system of the slice. The position of the selection region in relation to the device is established and stored taking into account this relative position in relation to the slice, the position of the imaged slice in relation to the device and the magnification scale used for imaging the slice.

In a step S7, the relative position of the selection region is transferred into the local coordinate systems, created in the step S4, of the other slices of the series of slices, as a result of which neighboring regions are generated on these slices, which neighboring regions correspond to the selection region. The transfer is brought about via coordinate transformation, that is to say the coordinates of the selection region in relation to the local coordinate system thereof are transferred into the local coordinate systems of the other slices.

The positions of the neighboring regions in relation to the device are established and stored in a step S8. This occurs by taking into account the relative position of the neighboring regions within the local coordinate systems of the further slices, the position of the further slices in relation to the device and the magnification scales used for imaging the further slices.

Using the coordinate data available now, the computer unit is able to actuate the microscope in such a way that it is possible to generate high resolution images of the selection and neighboring regions in an automated fashion. This occurs in a step S9, which concludes the method.

Figure 2:
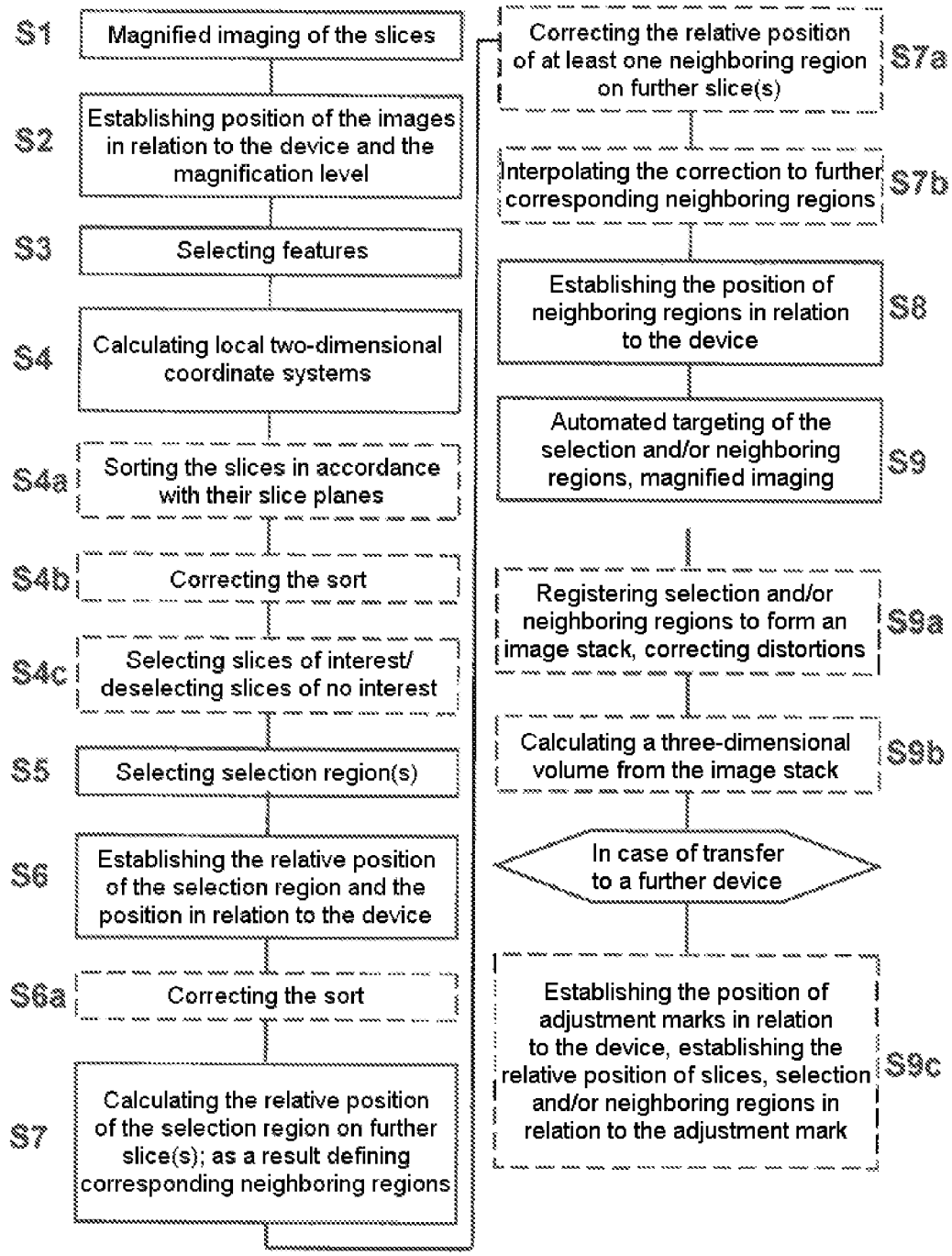
FIG. 2 shows the extension of the flowchart of FIG. 1 via a plurality of optional steps.

The flowchart of the method according to FIG. 2, which is extended compared to FIG. 1, contains a number of additional steps, which are identified by boxes with dashed lines. The additional method steps can individually, in any combination or all together be added to the method according to FIG. 1. In order to avoid unnecessary repetition, reference in respect of steps S1 to S8, which are illustrated as boxes with full lines in FIG. 2, is made to the corresponding explanations in accordance with FIG. 1.

In respect of steps S1 to S4, the method according to FIG. 2 is identical to the method in FIG. 1. The method according to FIG. 2 additionally has the step S4a. In step S4a, the slices imaged in step S1 are sorted according to the planes in which the slices were originally arranged in the biological sample. Here, it is left to the user to select, in a pre-selection, those slices of the series of slices which the user wishes to have sorted. The sort is subsequently carried out by the computer unit. The computer unit identifies the the differences from slice to slice from the information extracted from the selected features in step S3 and sorts the slices in accordance with their original positions in the sample by minimizing the differences. This is brought about by the two-dimensional cross-correlation of the edge information respectively extracted from the selected feature.

In a further step 4b, those slices for which the sort in step S4a has failed are output to the user, for example via the monitor. The user is given the option of discarding the unsorted slices, i.e. of removing these terminally from the sort sequence, or of inserting these manually into the sort sequence output at the end of step S4a.

The subsequent step S4c provides for the user to select, for the rest of the method, a portion of slices or a plurality of portions of slices, which are of interest for his examination problem, from the sort sequence output at the end of step S4a.

In steps S5 and S6, the method of FIG. 2 once again resembles the method specified in FIG. 1.

In a further step S6a, which has been newly introduced compared to the method in FIG. 1, provision is additionally made for a correction option which, at higher magnification, enables the user to specify the selection of the selection region in a spatially more precise fashion or to discard said selection. To this end, the selection region is targeted at high magnification and imaged in a magnified fashion. Hence the user can observe the selection region at high magnification and modify or discard it.

Between the method steps S7 and S8 of the method according to FIG. 1, the further steps S7a and S7b are inserted in the exemplary embodiment presented in FIG. 2. In step S7a, there is a correction of the relative positions of the neighboring regions on the further slices automatically established in step S7. Here, the user undertakes the correction of the position of at least one neighboring region on the monitor. In a subsequent step S7b, the further neighboring regions are repositioned by the computer unit. To this end, the computer unit interpolates the positional displacement of the manually re-corrected neighboring region to the further neighboring regions.

Compared to the method according to FIG. 1, the method according to FIG. 2 provides for the further steps S9a, S9b, S9c and S9d.

Step S9a provides for the computer unit to register, wholly or partly, the imaged selection region and the neighboring regions to form an image stack. The selection as to whether the selection region and all neighboring regions or only a portion thereof are registered is left to the user. The registration takes place in a pair-wise fashion between neighboring corresponding regions. The imaged selection region serves as reference image, which is compared to the closest imaged neighboring region, and wherein the process is repeated with each imaged neighboring region consecutively belonging to the series of images. Here structures which span several slices of the sample and therefore appear similar in the compared regions serve as orientation points, which simplifies the registration of the image data. In the case of biological samples, parts of sub-cellular structures and compartments or outlines, or the two-dimensional patterns of artificial structures introduced into the uncut sample, constitute suitable orientation points. In this fashion, the computer unit can identify and correct distortions in the slices, and so the image contents of the respective image pairs fit well to one another as a result thereof.

In step S9b, the computer unit reconstructs the image stack from step S9a to form a three-dimensional image data volume. This is brought about via conventional algorithms such as cross-correlation, disparity analysis or rendering algorithms, in particular volume rendering or surface rendering.

In a step S9c, provision is made for the object carrier, on which the slices are present in an immobilized fashion, to be provided with an adjustment mark. This adjustment mark defines a coordinate system which is individually valid for the object carrier. In step S9c, the computer unit establishes the position of the adjustment mark and the relative position of the slices and the selection and neighboring regions in relation to the adjustment mark.

Since the coordinates of the slices and of the selection and neighboring regions in relation to the object carrier are now known, it is now easily possible to supply the object carrier to a further microscope, which operates on the basis of a deviating microscopy modality, for example particle-optical imaging, in order likewise to image in an automated fashion there the regions selected in the light microscope.

Figure 3:
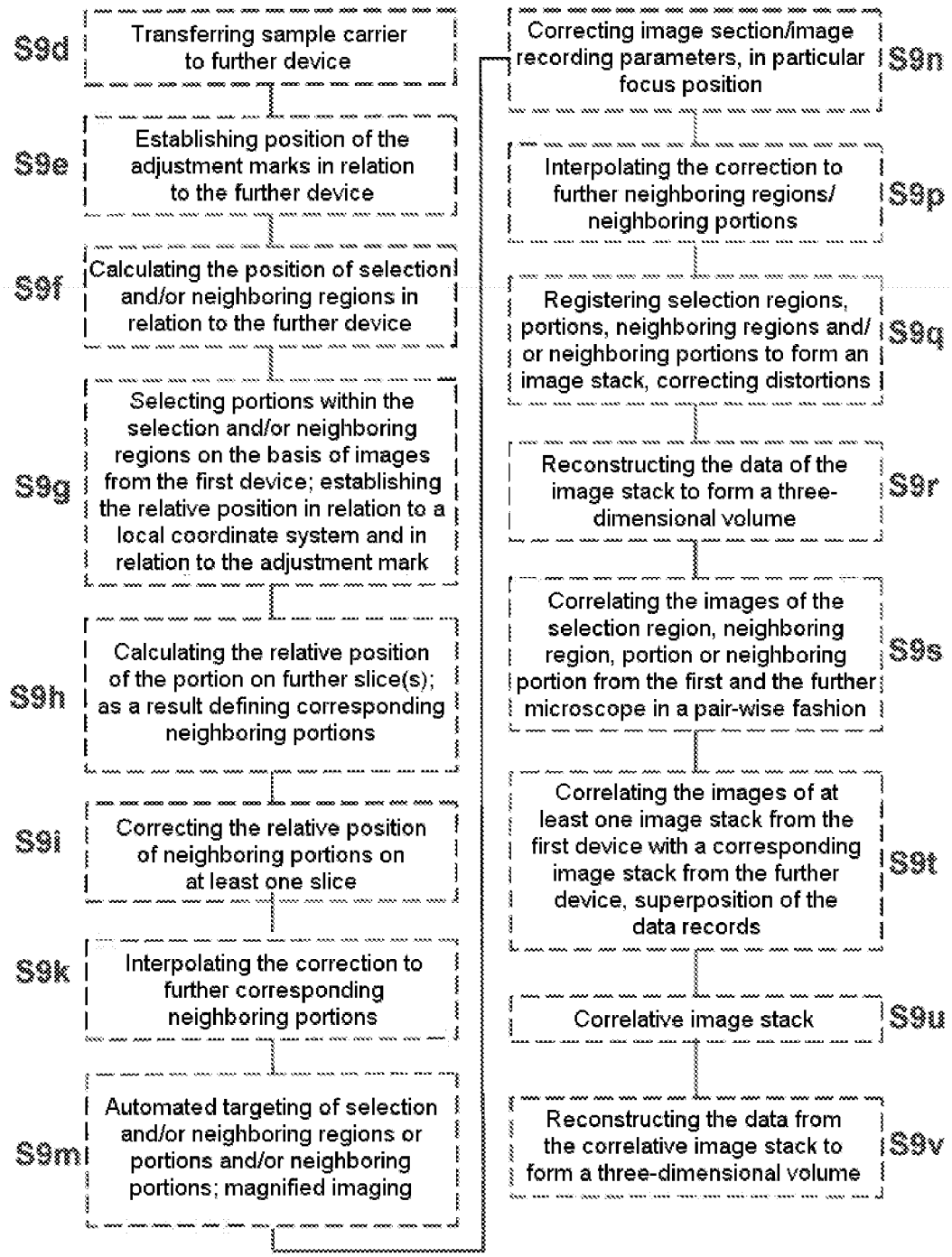
FIG. 3 shows further optional extensions of the method from FIG. 1.

The corresponding procedure illustrated in FIG. 3, comprising the steps S9d to S9v, should be understood to be a continuation of the method from FIG. 2.

In a step S9d, the object carrier is transferred to the further microscope. The further microscope is controlled by the same computer unit which also controls the light microscope.

In a step S9e, the position of the adjustment mark is established in relation to the further microscope.

Since the relative positions of the slices and of the selection and neighboring regions in relation to the adjustment mark are known, it is now possible in a step S9f to calculate the coordinate data of the slices, of the selection region and of the neighboring regions in relation to the further microscope. Using the coordinate information available thereafter, the computer unit is able to control the further microscope in such a way that slices, selection region and neighboring regions can be targeted and imaged in an automated fashion.

In a further step S9g, provision is made for it to be possible to select a portion within the selection and neighboring regions. This is brought about manually by the user, who fixes the portion on the monitor of the computer unit. The computer unit subsequently establishes the relative position of the portion in relation to the local coordinate system of the slice and in relation to the adjustment mark. As a result, the computer unit has all necessary positional data in order to prompt the further microscope to target the portion in an automated fashion.

In a further step S9h, the computer unit transfers the positional data of the portion relative to its local coordinate system to the local coordinate systems of the further slices analogously to the procedure in step S7 transfer, as a result of which the computer unit fixes neighboring portions in the further slices.

It is possible to correct the position of the neighboring portions in steps S9i and S9k. This is brought about analogously to the correction regime provided for in steps S7a and S7b, wherein the manual initial positional correction of a portion or a neighboring portion is provided in step S9i and the undertaken correction is interpolated to the neighboring portions in step S9k.

In a step S9m, the computer unit controls the further microscope, which subsequently, according to the commands of the user, automatically targets and images in a magnified fashion the selection region, neighboring regions, portion or neighboring portions. The computer unit expediently only takes into account the selection and neighboring regions selected in step S9a for the registration.

The correction of the image section or other image recording parameters, such as, for example, the focus position, takes place in steps S9n and S9p. The images created in the preceding step S9m serve as test images. The correction either already takes place when only one region is imaged in step S9m or only takes place once a plurality of or all desired regions have already been imaged. The correction of one region is undertaken in step S9n; in step S9p, the correction is likewise applied in an automated fashion to the neighboring region or neighboring portions via interpolation.

In a step S9q, the images of the selection region and the neighboring regions or of the portion and the neighboring portions, generated by the further microscope, are registered in a pair-wise fashion to an image stack in an analogous fashion to step S9a. Here, the computer unit identifies distortions in the slices and corrects these, and so the image contents of the respective image pairs fit well to one another as a result.

Subsequently, in step S9r, the computer unit reconstructs the data of the image stack from step S9q to form a three-dimensional image data volume, analogously to step S9b.

In steps S9s to S9v, provision is made for the images of the selection region and the neighboring regions from the light microscope to be correlated to the corresponding images from the further microscope and reconstructed to form a three-dimensional image data volume.

To this end, in a step S9s, the computer unit either correlates the images of the selection region and the neighboring regions from step S9 in a pair-wise fashion to the corresponding images from the further microscope from step S9m. Alternatively, it is possible in a step S9t for the computer unit to correlate the image stack from step S9a to the image stack from step S9q. As a result, in step S9u, the computer unit creates a correlative image stack, which the computer unit finally, in step S9v, reconstructs to form a correlative three-dimensional image data volume.

Figure 4:
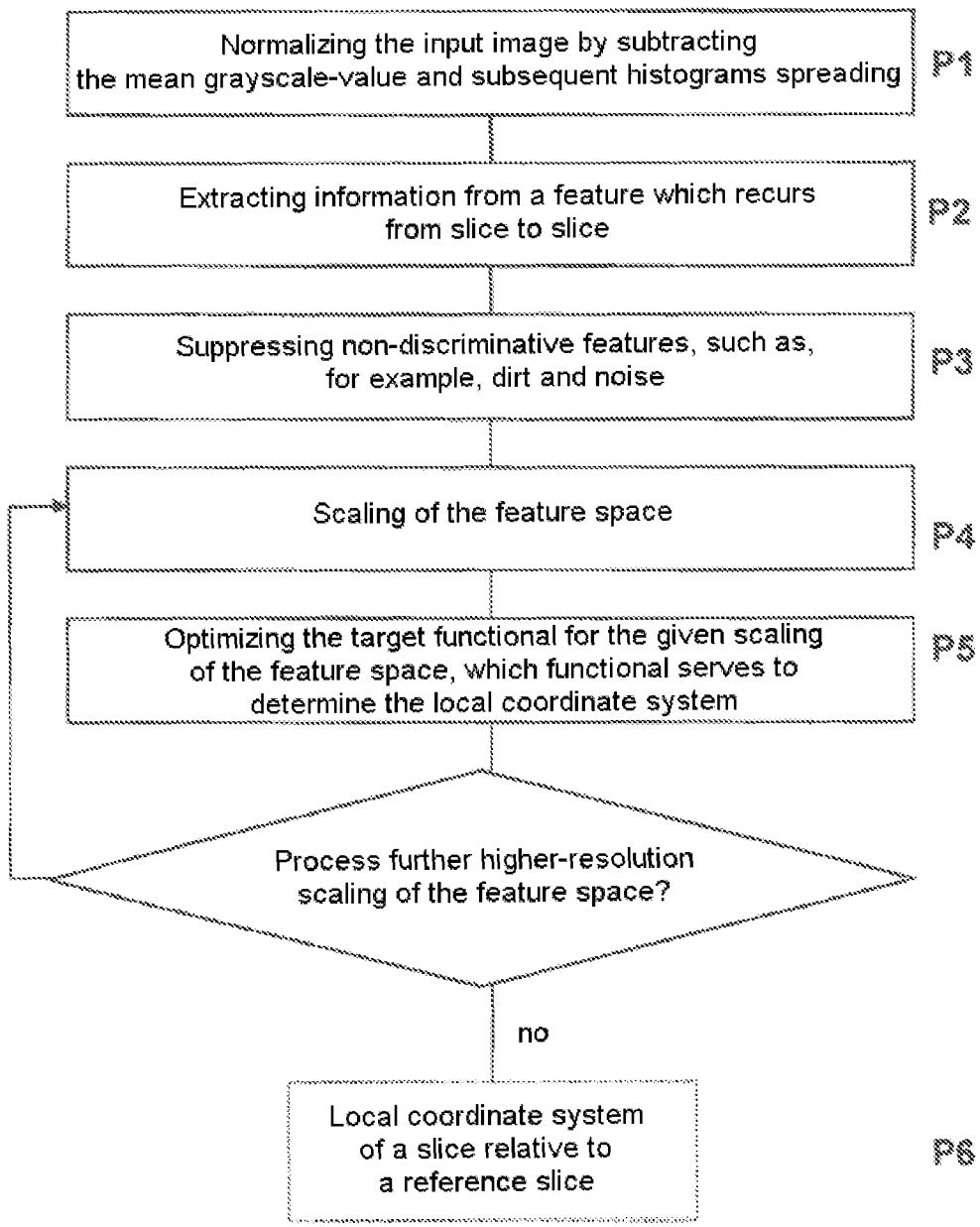
FIG. 4 shows an embodiment of the device according to the invention, which is configured to carry out the method according to FIG. 1.

FIG. 4 shows a suitable method for calculating local coordinate systems from information extracted from image contents, which is characterized by the following steps:

In a step P1, the imaged slice is normalized by subtracting the mean grayscale-value and subsequent histogram spreading.

In a step P2, information is extracted after selecting a feature which recurs from slice to slice.

In a step P3, non-discriminative information, such as, for example, dirt and noise, is suppressed.

The feature space is scaled in a step P4.

In a step P5, a target functional for the scaling of the feature space determined in step P4 is optimized, which functional serves to determine the local coordinate system.

To the extent that a higher resolution scaling of the feature space should subsequently be processed, the steps P4 and P5 are repeated for the higher resolution scaling.

Finally, in a step P6, a local coordinate system of a further imaged slice emerges relative to the (first) imaged slice.

Figure 5:
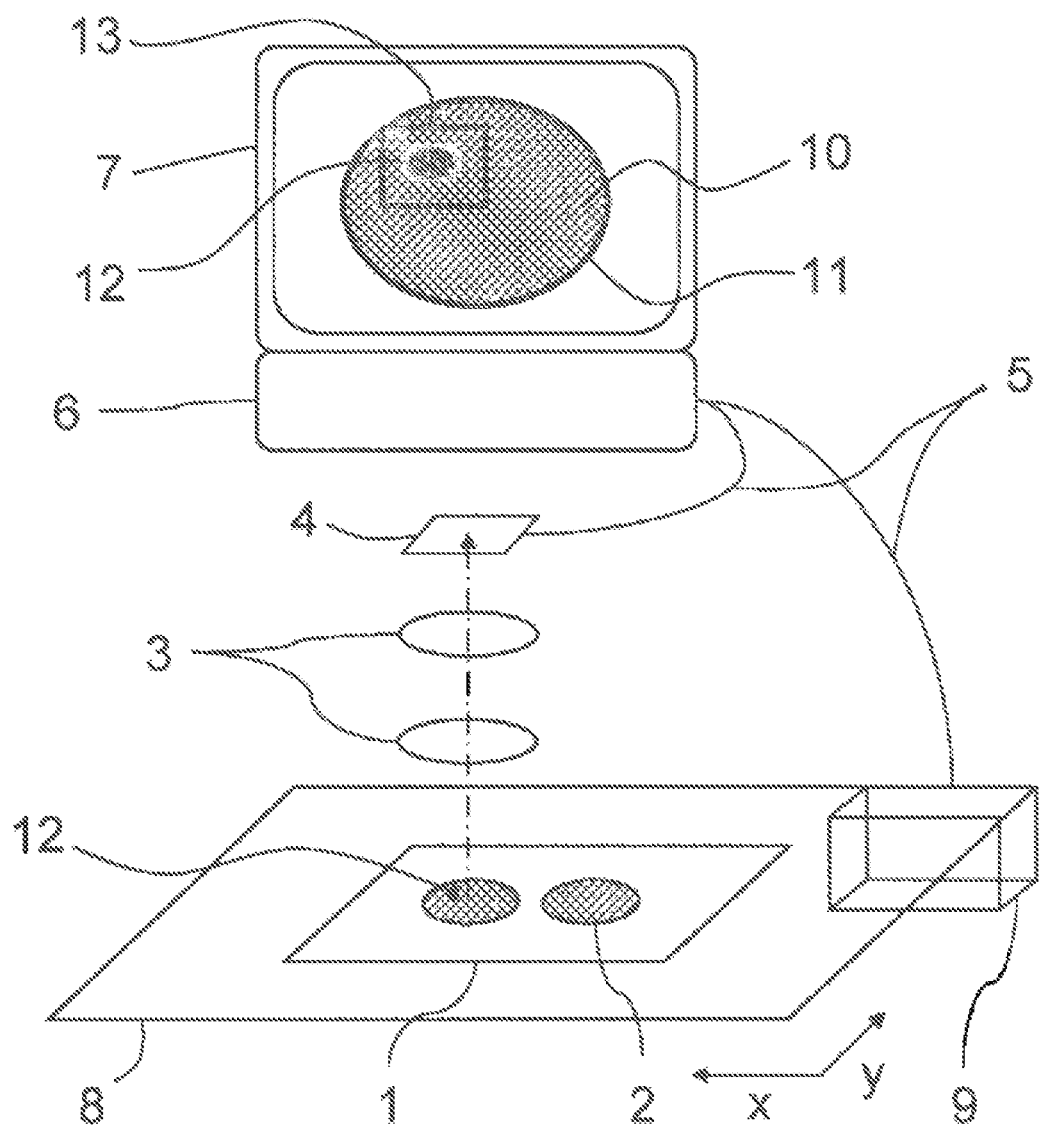
FIG. 5 shows a sample with artificially introduced bores according to an extension of the method.

FIG. 5 shows an embodiment of the device according to the invention. The device is configured to carry out the method illustrated in FIG. 1. Slices 2, which are immobilized on an object carrier 1, of a biological sample are imaged on a CCD or CMOS camera 4 via a light microscope 3, which can be a reflected-light or transmitted-light microscope with widefield illumination or scanning illumination. The camera 4 is, via a data/control cable 5, connected to a computer unit 6, i.e., for example, a personal computer (PC). Connected to the PC 6 is a monitor 7 for graphical output of the image contents recorded by the camera 4. Furthermore connected to the computer unit 6 is a controllable component which can be controlled by the computer unit 6 and which sends coordinate information to the computer unit. In the exemplary embodiment of FIG. 1, the controllable component is a stepper motor 9, which drives a receptacle device for the sample carrier 1. The receptacle device for the sample carrier 1 is, in the exemplary embodiment of FIG. 1, embodied as an X-Y table 8, which can be displaced in the x- and y-direction and to which the object carrier 1 is connected in a positionally fixed manner, for example by means of via a clamping connection (not illustrated).

When the camera 4 images a slice 2, the camera subsequently transmits the image data to the computer unit; the controllable component transfers the current position of the X-Y table to the computer unit in parallel and the computer unit links the positional data to the image data.

The computer unit is configured to calculate a local coordinate system for a supplied image content, for example an imaged slice 10, such that the position of predetermined regions, i.e. sub-image contents or individual pixels within the supplied image content, can be uniquely determined. To this end, the computer unit can select a feature, for example an outline structure 11, in an automated fashion, which feature should serve the calculation of the local coordinate system. To this end, a Canny edge filter is implemented in the computer unit, which filter can extract edges from the magnified image. In order to optimize the filter response in relation to dirt and noise, the Canny edge filter is already preset to edge structures typically to be expected in the recorded contrast. In order to minimize the computational complexity, provision is likewise made for the user to specify a sub-area of the image content to the computer unit, which sub-area has a feature suitable for generating the local coordinate system. The computer unit then only extracts the edge information from this sub-area and applies the local coordinate system calculated from this edge information to the whole image content. Moreover, the computer unit is also configured to output features to the user on the monitor image or on the basis of a selection menu, from which features the user can subsequently select manually.

If the user now selects a selection region 13 within the imaged slice 10, for example by way of fixing on the monitor an image section around a target structure 12 to be analyzed, the computer unit 6 can consequently establish the relative position of the selection region 13 in relation to the local coordinate system.

Furthermore, the computer unit 6 can likewise establish the position of the selection region 13 in relation to the X-Y table 8. This is possible because the computer unit 6 has available to it the coordinates of the imaged slice 2 in relation to the X-Y table 8, which coordinates represent the position of the central image pixel of the imaged slice in relation to the X-Y table 8. The lateral positional displacement of the selection region 13 from the central image pixel can be transformed by the computer unit 6 into the coordinate system of the X-Y table 8 and converted into control signals for the stepper motor 9.

Hence, the computer unit 6 can actuate the stepper motor 9 in such a way that the latter moves the X-Y table 8 in such a way that the selection region 13 is targeted. In the present case, "target" should be understood to mean that a predetermined image content is moved laterally into the optical axis of the microscope objective.

Furthermore, the computer unit 6 is also configured to transfer a selection region 13, selected on an imaged slice 10, into a further imaged slice. To this end, it is merely necessary for the computer unit 6 to have likewise calculated a local coordinate system for the further imaged slice, which local coordinate system is similar to the local coordinate system of the imaged slice. Ideally, the computer unit 6 has used the same feature when calculating the two local coordinate systems. By way of example, this is the case if the slices originate as neighbors from the same sample and the feature used by the computer unit 6 to extract the edge information extends over both slices in the uncut sample.

Hence, the computer unit 6 generates a neighboring region (not illustrated) on the further imaged slice, which neighboring region corresponds to the selection region 13. The transfer takes place via a coordinate transformation, i.e. the coordinates of the selection region in relation to the local coordinate system thereof are transferred into the local coordinate system of the further slice.

The computer unit 6 can now likewise establish the position of them neighboring region in relation to the X-Y table 8 and subsequently actuate the stepper motor 9 in such a way that the latter moves the X-Y table 8 in such a way that the region corresponding to the neighboring region is targeted on the further slice.

As a result, the computer unit can respectively target and image the selection region and the neighboring region in an automated sequence. This can take place using a high-resolution microscope objective.

Hence, using the device of the exemplary embodiment according to FIG. 5, it is possible to select a target structure 12 situated on a slice 2 by virtue of a selection region 13 being fixed around the target structure 12 on the imaged slice and by virtue of this target structure being imaged in a further slice, without the target structure being sought-after manually on the further slice.

Figure 6:
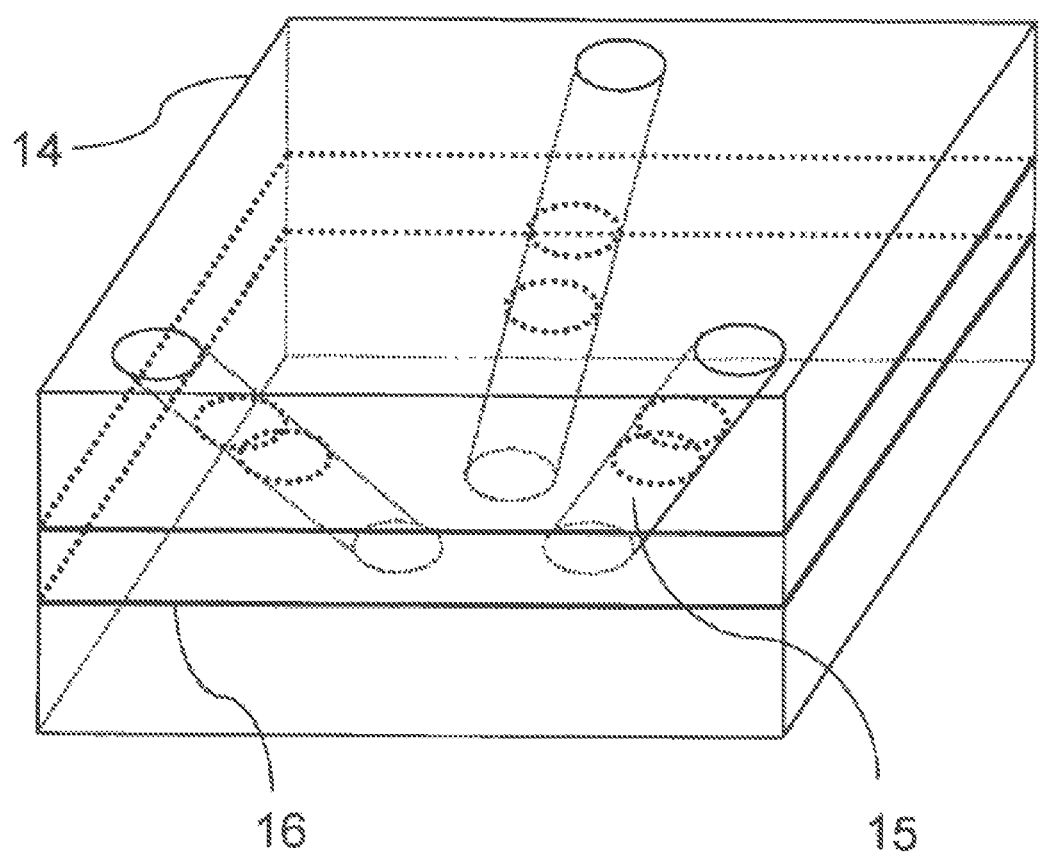
FIG. 6-8 show a sample block with three mutually approaching laser bores.

FIG. 6 shows a sample block 14, which was provided with three mutually approaching laser bores 15; the bores 15 were introduced into the uncut sample at mutually predetermined angles, respectively at an angle to the slice plane. Hence the bores define a global three-dimensional coordinate system define, valid for the whole sample volume or for most of it. The bores 15 form a unique two-dimensional pattern in each slice plane 16 of the sample 14, which pattern changes its dimensions from plane to plane. If the sample is cut into a plurality of thin slices, the bores remains visible on the slices. The outlines of the bores can ideally be used as features for calculating local coordinate systems on the slices since these bores provide a high edge contrast in the various microscope modalities and therefore supply robust information for edge detectors. The two-dimensional patterns of the bores, which change continuously from slice to slice, can moreover, in a simple fashion, serve to sort the images of the slices of a sample.

The sort of the images of neighboring slices of a sample can, by using the information extracted from the bore-hole outlines, for example be brought about by minimizing the pattern differences.

Moreover, it is possible to establish distortions or displacements within a slice. This is brought about by virtue of calculating the deviation of the two-dimensional pattern on an imaged slice from its original pre-known shape, as was present when bores were introduced into the uncut sample, and extrapolating the measure of the distortion established for the bores to the imaged slice or to regions of the slice.

Figure 7:
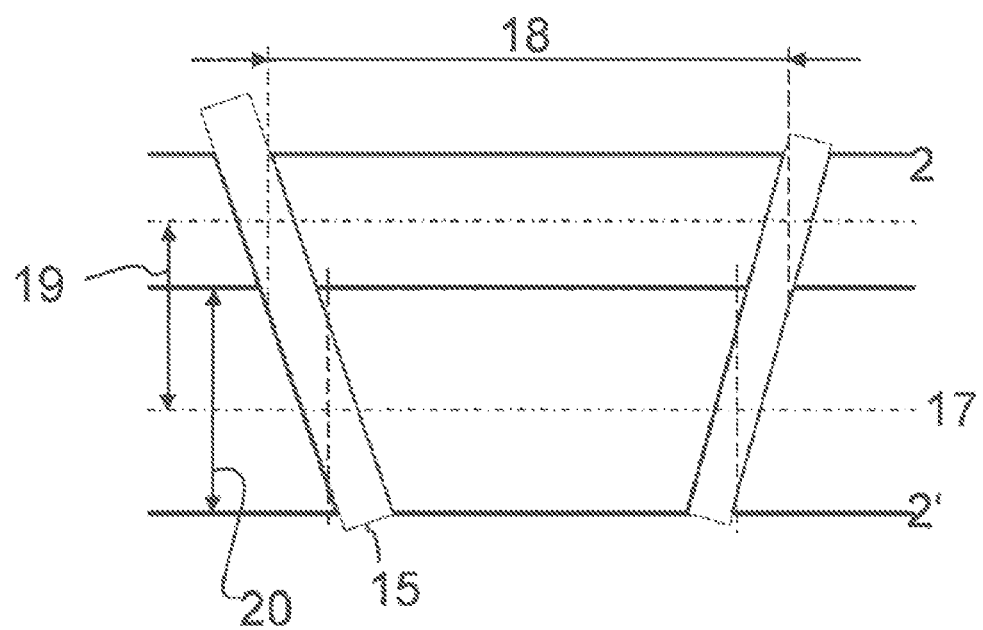
Figure 8:
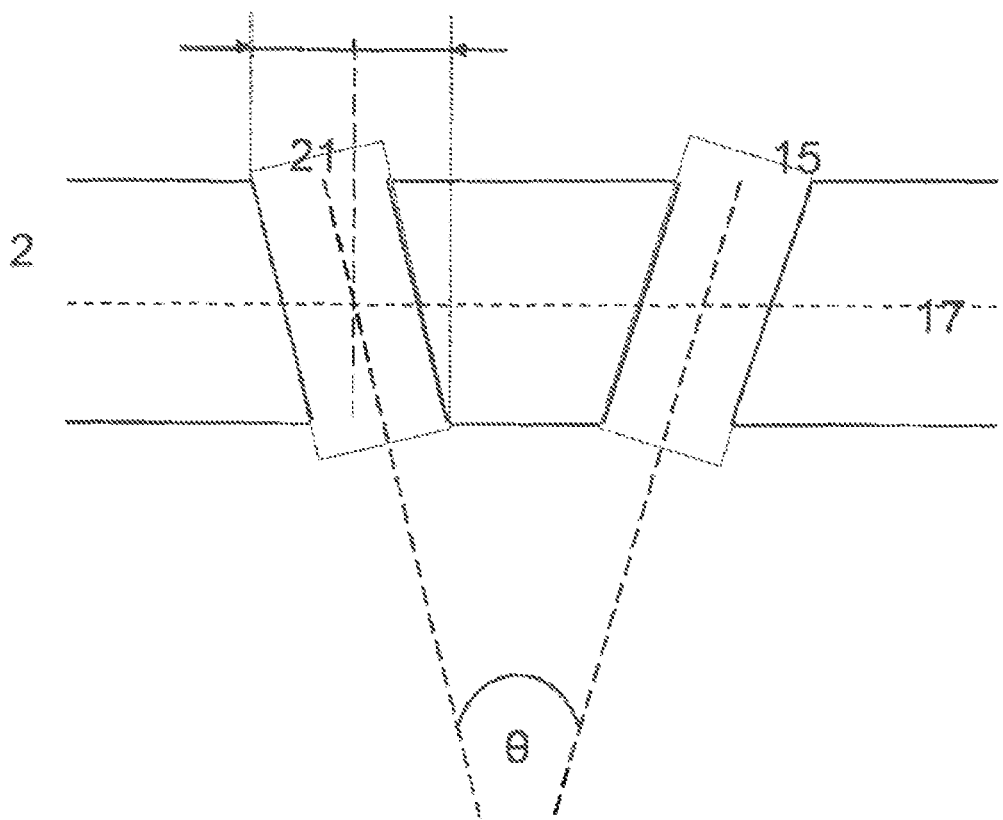

Moreover, the global three-dimensional coordinate system, fixed by the bores 15, also provides information about the distance between two slice planes in addition to the information about the slice plane of a slice. In the exemplary embodiments of FIGS. 6 to 8, bores 15 are used which have a diameter of between 0.2 μm and 5 μm and which, as can easily be identified in FIG. 7, are introduced into the sample volume at an angle θ of greater than 20° with respect to one another. The differences in the dimensions of the two-dimensional patterns represented by the bores on the slices of the sample 14 can easily be converted by a computer unit into the distance which the slice planes of the two slices have from one another. This slice-plane distance 19 varies, as can be seen from FIG. 6, depending on the specific slice thicknesses 20. In the case of the three-dimensional reconstruction of the imaged slices, the slice-plane distance 19 can also be included in the calculation and therefore renders possible a significantly more accurate reconstruction than is possible using a "fictitious slice-plane distance" which is assumed to be the same for all slices. Local compressions or expansions of the three-dimensional reconstruction item, which necessarily occur if a "fictitious slice-plane distance" is used as the basis for the calculation, are thus prevented.

The invention claimed is:

1. A method, comprising:
   a) using a device to obtain a magnified image of first and second slices of a sample, the first and second slices of the sample being present on a sample carrier, the sample carrier being connected to the device via a sample-carrier receptacle, a position of the imaged first and second slices in relation to the device being recorded, and a magnification level of the imaging being recorded;
   b) defining a first local coordinate system specific to the first slice via a selected feature contained in the imaged first slice, and defining a second local coordinate system specific to the second slice via a selected feature contained in the imaged second slice;
   c) selecting a region within the imaged first slice, establishing a position of the selected region with respect to the first local coordinate system, and establishing a position of the selected region with respect to the device;
   d) transferring the position of the selected region into the second local coordinate system to set a neighboring region on the second slice;
   e) establishing a position of the neighboring region in relation to the device; and
   f) using the device to take a magnified image of: i) the selected region; and/or ii) the neighboring region.

2. The method of claim 1, wherein the selected feature contained in the image information of the imaged first slice comprises at least one contour and/or structure, and the selected feature contained in the image information of the imaged second slice comprises at least one contour and/or structure.

3. The method of claim 1, further comprising:
using the device to obtain a magnified image of a third slice of the sample; and
sorting the imaged first, second and third slices based on features contained in the image information of the imaged first, second and third slices to reproduce original positions of the first, second and third slices and to minimize differences in the features.

4. The method of claim 1, further comprising:
forming an image series comprising the selected region and the neighboring region; and
at least partially assembling the image series to form a three-dimensional image data volume.

5. The method of claim 1, further comprising:
selecting at least one outline structure of the imaged first slice to define the first local coordinate system; and
selecting at least one outline structure of the imaged second slice to define the second local coordinate system.

6. The method of claim 1, further comprising;
before forming the first and second slices, artificially introducing structures into the sample; and
using the artificially introduced structures to define the first and second local coordinate systems.

7. The method of claim 6, wherein the artificially introduced structures comprise bores.

8. The method of claim 1, wherein the sample carrier comprises an adjustment mark which establishes a global reference system which is valid individually for the sample carrier, and the method further comprises:
obtaining a magnified image of the adjustment mark;
storing a position of the adjustment mark in relation to the device; and
storing a position of the selected region and/or the neighboring region relative to the adjustment mark.

9. The method of claim 8, further comprising:
at least partially transmitting data to a further device configured to image samples, the further device being connected to the sample carrier, and the data comprising data recorded during the imaging of the first and second slices, the selected region and/or the neighboring region; and
using the further device to obtain a magnified image of the selected region and/or the neighboring region.

10. The method of claim 9, further comprising:
forming an image series comprising the selected region and/or the neighboring; and
at least partially assembling the image series to form a three-dimensional image data volume.

11. The method of claim 9, further comprising correlating the selected region and the neighboring region to provide image data.

12. The method of claim 9, further comprising:
selecting a first portion within the selected region;
establishing a position of the first portion in relation to the first local coordinate system;
establishing a position of the first portion relative to the adjustment mark;
transferring the position of the first portion into the second local coordinate system to set a neighboring portion on the second slice in relation to the adjustment mark;
using the further device to obtain a magnified image of the first portion and the neighboring portion;
forming an image series comprising the first portion and the neighboring portion; and
at least partially assembling the image series to form a three-dimensional image data volume.

13. A device, comprising:
a receptacle apparatus for a sample carrier;
a controllable component;
one or more processing devices; and
one or more machine-readable media configured to store instructions that are executable by the one or more processing devices to perform operations comprising the method of claim 1.

14. The device of claim 13, wherein:
the controllable component is configured to target predetermined positions on the sample carrier; and
the one or more processing devices and the one or more machine-readable media are configured to:
control the controllable component;
evaluate images or parts of images to establish individually valid coordinate systems for these images, the coordinate systems assigning a relative position to points or regions within the validity of such a coordinate system;
establish the relative position of points or regions within such a coordinate system;
transfer the relative position of points or regions in an image to similar images; and
relate the relative position and/or transferred relative position to further coordinate systems to derive control commands for the at least one controllable component.

15. The device of claim 13, wherein the one or more processing devices and the one or more machine-readable media are configured to: sort a series of similar images; and interpret selected features, and wherein the sort takes place by minimizing the differences in features.

16. The device of claim 13, wherein the one or more processing devices and the one or more machine-readable media are configured to register series of similar images wholly or partly and to reconstruct the registered images to form a three-dimensional image data volume.

17. The device of claim 13, wherein the device is used for imaging radiation obeying the laws of optics.

18. One or more non-transitory machine-readable media configured to store instructions that are executable by one or more processing devices to perform a sequence of control commands comprising:
causing a device for magnified imaging of samples to carry out the method of claim 1.

19. One or more non-transitory machine-readable media configured to store instructions that are executable by one or more processing devices to perform a sequence of control commands comprising:
sequentially causing at least two devices for magnified observation of samples to carry out the method of claim 1.

20. The method of claim 9, further comprising:
selecting a first portion within the neighboring region;
establishing a position of the first portion in relation to the second local coordinate system;
establishing a position of the first portion relative to the adjustment mark;
transferring the position of the first portion into the first local coordinate system to set a neighboring portion on the first slice in relation to the adjustment mark;
using the further device to obtain a magnified image of the first portion and the neighboring;
forming an image series comprising the first portion and the neighboring portion; and
at least partially assembling the image series to form a three-dimensional image data volume.

21. The method of claim 1, wherein f) comprises using the device to take a magnified image of the selected region.

22. The method of claim 21, wherein f) comprises using the device to take a magnified image of the neighboring region.

23. The method of claim 1, wherein f) comprises using the device to take a magnified image of the neighboring region.

24. A method of analyzing first and second slices of a sample, the method comprising:
- using the device to obtain an image of the first slice to provide a first image;
- defining a first local coordinate system specific to the first slice based on a feature contained in the first image;
- using the device to obtain an image of the second slice to provide a second image;
- defining a second local coordinate system specific to the second slice based on a feature contained in the second image;
- establishing a position of a region within the first image relative to the first local coordinate system;
- establishing a position of the region within the first image relative to the device;
- transferring the position of the region within the first image into the second local coordinate system to set a region on the second slice;
- establishing a position of the region on the second slice relative to the device; and
- using the device to take a magnified image of at least one region selected from the group consisting of the region within the first image and the region on the second slice.

25. The method of claim 24, wherein the at least one region comprises the region within the first image.

26. The method of claim 25, wherein the at least one region comprises the region on the second slice.

27. The method of claim 24, wherein the at least one region comprises the region on the second slice.

28. The method of claim 24, wherein the first and second slices are connected to the device.

* * * * *

UNITED STATES PATENT AND TRADEMARK OFFICE
CERTIFICATE OF CORRECTION

| | | |
|---|---|---|
| PATENT NO. | : 9,117,102 B2 | Page 1 of 1 |
| APPLICATION NO. | : 13/894532 | |
| DATED | : August 25, 2015 | |
| INVENTOR(S) | : Christian Thomas et al. | |

It is certified that error appears in the above-identified patent and that said Letters Patent is hereby corrected as shown below:

Title page, Item (57) "Abstract", delete text and replace with -- A method for the magnified depiction of samples is disclosed. At least two sections from a sample, which are present on at least one sample carrier, are depicted in magnified form using an apparatus for the magnified depiction of samples. The sample carrier is connected to the apparatus via a sample carrier holder. The position of the depicted sample carrier regions in relation to the apparatus and the magnification stage used are recorded. At least one selected feature contained in the image information from the sections depicted in magnified form is used to define local coordinate systems, which are specific to the respective section, for the at least two sections depicted in magnified form. --.

Specification

Col. 18, lines 7-8, delete "the the" and insert -- the --.

Col. 19, line 21, delete "the the" and insert -- the --.

Claims

Col. 25, line 20, Claim 6, delete "comprising;" and insert -- comprising: --.

Signed and Sealed this
Fifteenth Day of March, 2016

Michelle K. Lee
*Director of the United States Patent and Trademark Office*